US011568676B2

United States Patent
Kaneichi et al.

(10) Patent No.: US 11,568,676 B2
(45) Date of Patent: Jan. 31, 2023

(54) INFORMATION PROCESSING SYSTEM, PROGRAM, AND VEHICLE

(71) Applicant: TOYOTA JIDOSHA KABUSHIKI KAISHA, Toyota (JP)

(72) Inventors: Daiki Kaneichi, Nisshin (JP); Daisuke Tanabe, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/727,065

(22) Filed: Dec. 26, 2019

(65) Prior Publication Data
US 2020/0250407 A1 Aug. 6, 2020

(30) Foreign Application Priority Data

Feb. 5, 2019 (JP) .............................. JP2019-019133

(51) Int. Cl.
*G06V 40/16* (2022.01)
*G06F 21/32* (2013.01)
*G06Q 50/30* (2012.01)

(52) U.S. Cl.
CPC ............ *G06V 40/172* (2022.01); *G06F 21/32* (2013.01); *G06Q 50/30* (2013.01); *G06T 2207/30201* (2013.01)

(58) Field of Classification Search
CPC ........... G06K 9/00288; G06K 9/00892; G06K 9/00932; G06K 9/00771; G06K 9/00268; G06K 9/00885; G06F 21/32; G06T 2207/30201; G06Q 50/30; G07B 11/00; G08G 1/04
See application file for complete search history.

(56) References Cited

U.S. PATENT DOCUMENTS 8,577,810 B1 * 11/2013 Dalit .................... G06Q 20/206
705/67
9,594,894 B2 * 3/2017 Azar ........................ H04N 7/18
(Continued)

FOREIGN PATENT DOCUMENTS

JP 2003-162740 A 6/2003
JP 2009-187275 A 8/2009
(Continued)

OTHER PUBLICATIONS

Samsung Galaxy Note 9, WIKIPEDIA (Year: 2018).*

*Primary Examiner* — Edward F Urban
*Assistant Examiner* — Wassim Mahrouka
(74) *Attorney, Agent, or Firm* — Oliff PLC

(57) ABSTRACT

An information processing system includes a vehicle, and a server communicable with the vehicle. The vehicle includes a first acquisition unit configured to acquire first vital information on a user who boards the vehicle. The vehicle is configured to transmit to the server the first vital information on the user acquired with the first acquisition unit. The server is configured to prestore first vital information and settlement information on a registered user, determine whether or not the user is the registered user based on the first vital information on the user received from the vehicle and the first vital information on the registered user, and execute, when determining that the user is the registered user, a settlement process based on the settlement information on the registered user.

8 Claims, 5 Drawing Sheets

(56) References Cited

U.S. PATENT DOCUMENTS

| | | | |
|---|---|---|---|
| 2006/0056663 A1* | 3/2006 | Call | G06K 9/0002 |
| | | | 382/115 |
| 2010/0175323 A1* | 7/2010 | Plaster | H04N 7/18 |
| | | | 49/70 |
| 2011/0032076 A1* | 2/2011 | Rickman | G06K 9/00892 |
| | | | 340/5.82 |
| 2016/0311646 A1* | 10/2016 | Bryant | B66B 1/468 |
| 2016/0328896 A1* | 11/2016 | Zheng | H05B 47/125 |
| 2017/0091570 A1* | 3/2017 | Rao | G06K 9/00979 |
| 2017/0286780 A1 | 10/2017 | Zhang et al. | |
| 2019/0035042 A1* | 1/2019 | Attar | G06Q 50/265 |
| 2019/0221060 A1* | 7/2019 | Liu | G06K 9/00892 |
| 2020/0058032 A1* | 2/2020 | Lad | G06F 21/316 |
| 2020/0293760 A1* | 9/2020 | Sun | G06K 9/00288 |

FOREIGN PATENT DOCUMENTS

| | | | |
|---|---|---|---|
| JP | 2018-092388 A | | 6/2018 |
| JP | 2018092388 A | * | 6/2018 |
| JP | 2018-523234 A | | 8/2018 |
| JP | 2018-169942 A | | 11/2018 |

* cited by examiner

INFORMATION PROCESSING SYSTEM, PROGRAM, AND VEHICLE

INCORPORATION BY REFERENCE

The disclosure of Japanese Patent Application No. 2019-019133 filed on Feb. 5, 2019 including the specification, drawings and abstract is incorporated herein by reference in its entirety.

BACKGROUND

1. Technical Field

The present disclosure relates to an information processing system, a program, and a vehicle.

2. Description of Related Art

A technique of managing boarding information on users who board a vehicle, such as a bus, is conventionally known. For example, Japanese Patent Application Publication No. 2003-162740 discloses an automatic gate machine that performs a ticket collection process with a noncontact integrated circuit (IC) card as a passenger ticket.

SUMMARY

However, in the related art, a user needs to possess and present a noncontact IC card, a smartphone, or the like, that is used as a passenger ticket, when boarding a vehicle. Accordingly, in the case where, for example, a user has many pieces of baggage, it may be a burden for the user to present a noncontact IC card, a smartphone, or the like. In some cases, possessing or operating the IC card, the smartphone, or the like, itself may be a burden for the user. Therefore, the technique of managing the boarding information on users who board a vehicle has room for enhancing the convenience.

An object of the present disclosure, made in view of these circumstances, is to provide an information processing system, a program, and a vehicle that enhance the convenience of the technique of managing boarding information on users who board a vehicle.

The information processing system according to one aspect of the present disclosure is an information processing system, including a vehicle; and a server that is communicable with the vehicle. The vehicle includes a first acquisition unit configured to acquire first vital information on a user who boards the vehicle. The vehicle is configured to transmit to the server the first vital information on the user acquired with the first acquisition unit. The server is configured to prestore first vital information and settlement information on a registered user, determine whether or not the user is the registered user based on the first vital information on the user received from the vehicle and the first vital information on the registered user, and execute, when determining that the user is the registered user, a settlement process based on the settlement information on the registered user.

A program according to one embodiment causes a server that is communicable with a vehicle to execute the steps. The steps includes: storing first vital information and settlement information on a registered user; receiving from the vehicle first vital information on a user who boards the vehicle; determining whether or not the user is the registered user based on the first vital information on the user received from the vehicle and the first vital information on the registered user; and executing, when determining that the user is the registered user, a settlement process based on the settlement information on the registered user.

A vehicle according to one embodiment includes a first acquisition unit configured to acquire first vital information on a user who boards the vehicle. The vehicle is configured to transmit to the server the first vital information on the user acquired with the first acquisition unit.

The information processing system, the program, and the vehicle according to one embodiment enhance the convenience of the technique of managing the boarding information on users who board a vehicle.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Description is now given of the embodiments.

Configuration of Information Processing System

Figure 1:
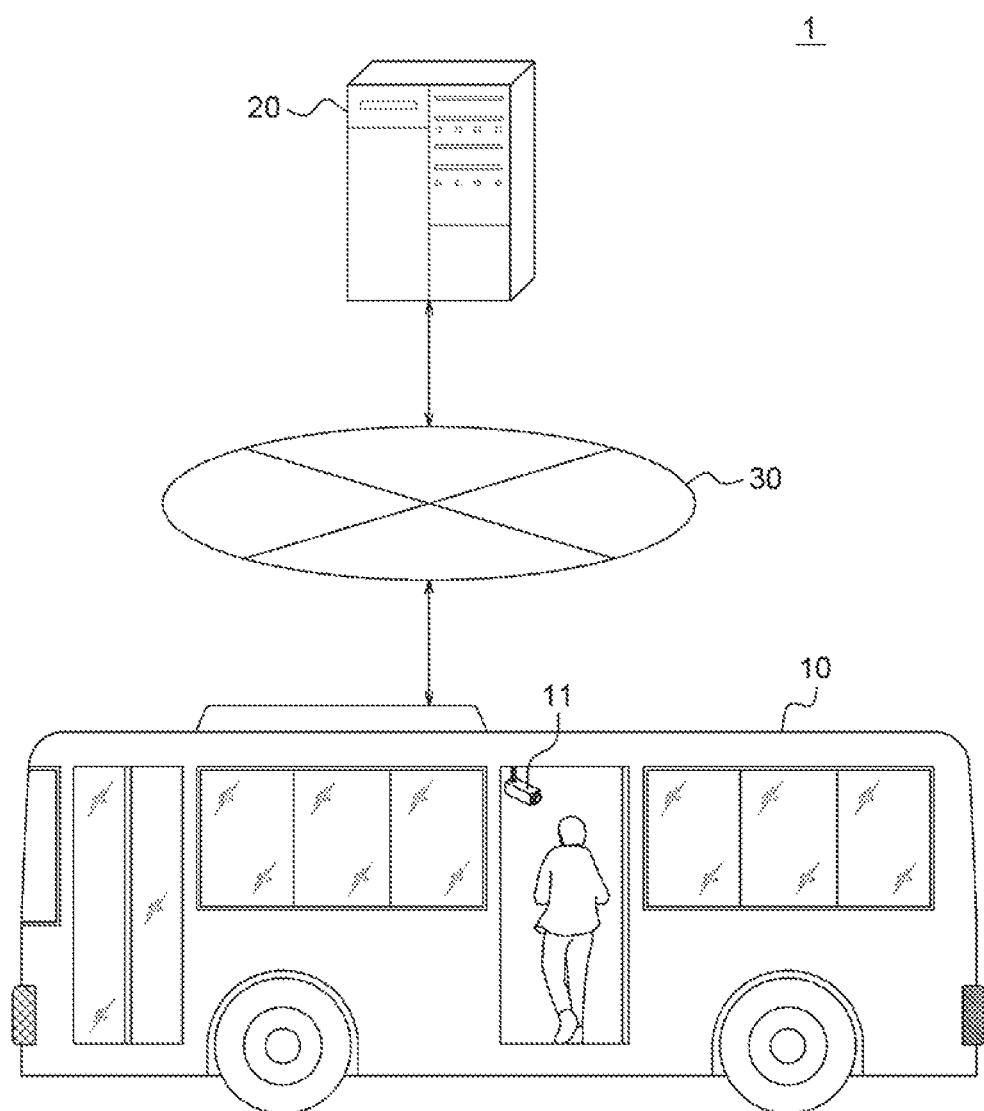
FIG. 1 shows the schematic configuration of an information processing system according to one embodiment.

With reference to FIG. 1, the outline of an information processing system 1 according to one embodiment will be described. The information processing system 1 includes a vehicle 10 and a server 20. For example, the vehicle 10 is a bus. However, without being limited to this, the vehicle 10 may be any vehicle, such as a taxi, that carries passengers. The server 20 includes one or more information processing apparatuses (for example, server apparatuses) that are communicable with each other. The vehicle 10 is communicable with the server 20 through a network 30 including, for example, a mobile communication network, and the Internet. In FIG. 1, one vehicle 10 and one server 20 are shown for the sake of simple explanation. However, the information processing system 1 may include any number of vehicles 10 and servers 20.

The present embodiment will be described briefly, and then described later in detail. The information processing system 1 is used for management of boarding information on a user who boards the vehicle 10, such as a bus, for example. The vehicle 10 acquires, with a first acquisition unit 11, first vital information on a user who uses the vehicle 10 as a passenger. The first acquisition unit 11 may include, for example, a camera so as to photograph the face of the user as the first vital information. The vehicle 10 transmits the acquired first vital information on the user to the server 20 through the network 30.

The server 20 prestores information on registered users who are registered as users permitted to board the vehicle 10. The server 20 stores the first vital information and settlement information as the information on registered users, for example. The server 20 collates the first vital information on the user received from the vehicle 10 with the first vital information on the registered users, and determines whether or not the user is the registered user. The server 20 transmits to the vehicle 10 a determination result regarding whether or not the user is the registered user. When determining that the user is the registered user, the server 20 executes a settlement process including a billing process, a withdrawal process, and a charging process based on the settlement information on the registered user. As a consequence, when a user of the vehicle 10 boards or leaves the vehicle 10, the information processing system 1 can determine whether or not the user is the registered user by acquiring the vital information on the user, and can perform the settlement of a fare, or the like, without the necessity of requesting the user to possess an IC card or to purchase a passenger ticket. Therefore, the technique of managing the boarding information on users who board the vehicle 10 is enhanced.

Next, respective component members of the information processing system 1 will be described in detail.

Vehicle Configuration

Figure 2:
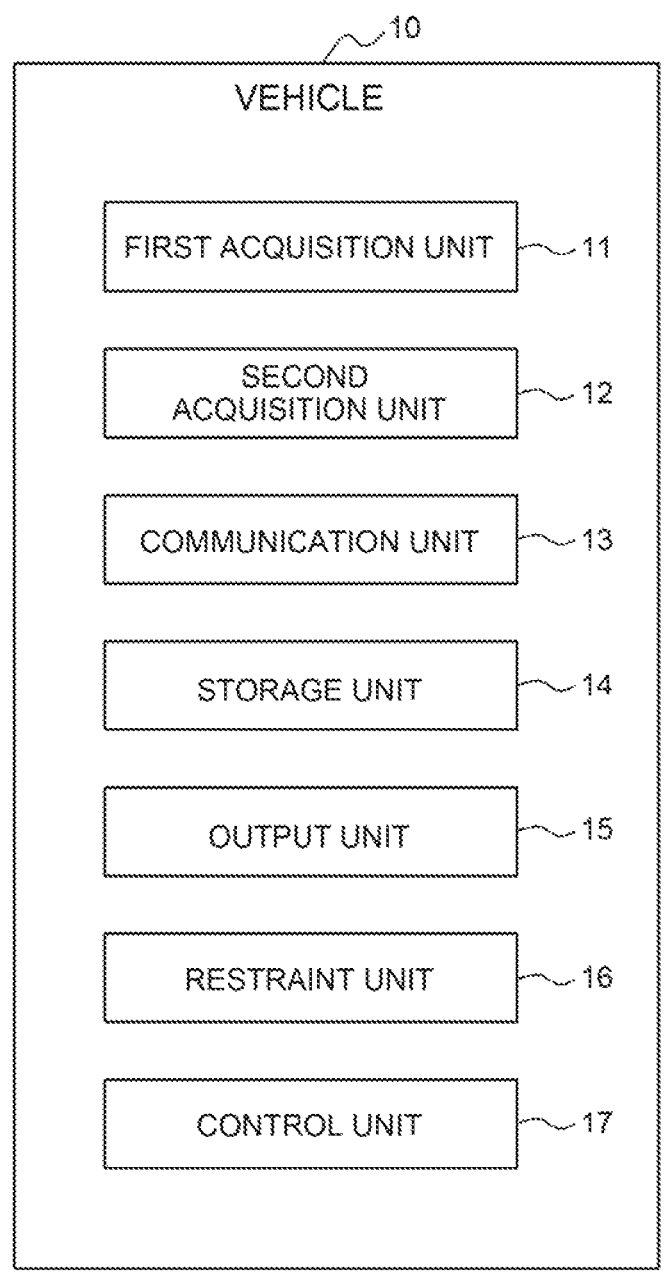
FIG. 2 is a block diagram showing the schematic configuration of a vehicle included in the information processing system.

The configuration of the vehicle 10 in the information processing system 1 will be described in detail. As shown in a block diagram of FIG. 2, the vehicle 10 includes a first acquisition unit 11, a second acquisition unit 12, a communication unit 13, a storage unit 14, an output unit 15, a restraint unit 16, and a control unit 17. The first acquisition unit 11, the second acquisition unit 12, the communication unit 13, the storage unit 14, the output unit 15, the restraint unit 16, and the control unit 17 may each be incorporated in the vehicle 10, or may be detachably provided in the vehicle 10. The first acquisition unit 11, the second acquisition unit 12, the communication unit 13, the storage unit 14, the output unit 15, the restraint unit 16, and the control unit 17 are communicably connected with each other through an in-vehicle network, such as a controller area network (CAN), or an exclusive line.

The first acquisition unit 11 acquires the first vital information on a user. The first acquisition unit 11 may be disposed at a position where the first vital information on the user who boards the vehicle 10 can be acquired, such as in the vicinity of a vehicle entryway of the vehicle 10, for example. For example, the first vital information is face information. However, without being limited to this, the first vital information may be any information indicating any human bodily features, such as information on a vein, a fingerprint, and an iris, for example. In this specification, "face information" includes an image such as a photographed static image or moving image of the face, or features of the face extracted from the photographed image. However, without being limited to these, the face information may include any information regarding the human face. When the first vital information is the face information, the first acquisition unit 11 may also include a camera to photograph the face of the user. When the face information is adopted as the first vital information, and the face of the user is photographed at the time of boarding, illegal boarding and criminal acts by the user during boarding can be restrained. The first acquisition unit 11 may acquire the first vital information in a non-contact manner. This makes it possible to restrain increase in burden of the user caused when the first acquisition unit 11 acquires the first vital information.

The second acquisition unit 12 acquires second vital information different from the first vital information on the user. The second acquisition unit 12 may be disposed at a position where the second vital information on the user who boards the vehicle 10 can be acquired, such as in the vicinity of the vehicle entryway of the vehicle 10, for example. The second vital information is secondarily used in order to identify the user, when the first vital information is not usable nor sufficient for uniquely identifying the user. For example, the second vital information is vein information. However, without being limited to this, the second vital information may be any information indicating any human bodily features, such as information on a face, a fingerprint, and an iris. When the second vital information is vein information, the second acquisition unit 12 may include a sensor for sensing veins on the palm, or other portions, of the user. When the vein information is adopted as the second vital information, the information on the inside of the human body, which is hardly known to others, is acquired. This makes it possible to restrain disguised acts of the user by using the vital information of others. The second acquisition unit 12 may acquire the second vital information in a non-contact manner. This makes it possible to restrain increase in burden of the user caused when the second acquisition unit 12 acquires the second vital information.

The communication unit 13 includes a communication module connected to the network 30. The communication module conforms to, for example, 4th generation (4G) and 5th generation (5G) mobile object communication standards. However, without being limited to these, the communication module may conform to any communication standards. For example, an on-board communication device, such as a data communication module (DCM) may function as the communication unit 13. In the present embodiment, the vehicle 10 is connected to the network 30 through the communication unit 13. Hence, the vehicle 10 can communicate with the server 20.

The storage unit 14 includes one or more memories. Although examples of the "memory" include a semiconductor memory, a magnetic memory, or an optical memory in the present embodiment, the memory is not limited to these. The memory or memories included in the storage unit 14 may each function as a main storage, an auxiliary storage, or a cache memory, for example. The storage unit 14 stores any information that is used for operation of the vehicle 10. For example, the storage unit 14 may store information such as a system program, application programs, and built-in software. The information stored in the storage unit 14 may be updated with the information that is acquired from the network 30 through the communication unit 13, for example. The storage unit 14 may store vehicle identification information that uniquely identifies the vehicle 10, for example. The vehicle identification information is, for example, a vehicle identifier (ID) output by the server 20. However, without being limited to this, the vehicle identification information may include any information, such as a chassis number and a vehicle registration number of the vehicle 10.

The output unit 15 outputs information by sound, vibration, or an image. The output unit 15 may include at least one of a speaker, a vibrator, a display device, and the like. The output unit 15 may output a determination result regarding whether or not a passenger is the registered user, or information on the user who stays in the vehicle 10. For example, when receiving the determination result regarding whether or not the user is the registered user from the server 20, the output unit 15 may display the determination result on a display device to notify the determination result to the driver or users of the vehicle 10.

The restraint unit 16 restrains boarding of a user. For example, the restraint unit 16 is a gate bar provided in the vicinity of the vehicle entryway of the vehicle 10. However, without being limited to this, the restraint unit 16 may be any device that can restrain boarding of the user, such as a door provided in the vehicle entryway. For example, based on control of the control unit 17, the restraint unit 16 is opened or closed so as to permit or restrain boarding of the user. The restraint unit 16 may be a normally open restraint unit that normally permits boarding of the user and that restrains boarding of the user based on the control of the control unit 17. Alternatively, the restraint unit 16 may a normally closed restraint unit that normally restrains boarding of the user and that permits boarding of the user based on the control of the control unit 17.

The control unit 17 includes one or more processors. The control unit 17 may control each of the first acquisition unit 11, the second acquisition unit 12, the communication unit 13, the storage unit 14, the output unit 15, and the restraint unit 16 described above so as to implement each of the functions thereof. For example, an electronic control unit (ECU) mounted on the vehicle 10 may function as the control unit 17. In the present embodiment, "processor" is a general-purpose processor, a special-purpose processor dedicated for specific processing, or the like. However, the "processor" is not limited to these.

The process of the vehicle 10 implemented when the control unit 17 controls each of the functions of the vehicle 10 will be described below. For example, the vehicle 10 transmits to the server 20 the first vital information on a user acquired with the first acquisition unit 11. When the first vital information is face information, the vehicle 10 may transmit an image, such as a static image or a moving image, obtained by photographing the face of the user, to the server 20 as the first vital information. Alternatively, the vehicle 10 may extract any features of the face of the user from the photographed image of the face of the user by image recognition, and transmit the extracted features of the face as the first vital information to the server 20. The control unit 17 may transmit vehicle identification information that uniquely identifies the vehicle 10, such as the vehicle ID described above, to the server 20 together with the first vital information.

The vehicle 10 receives a determination result determined by the server 20 from the server 20, the determination result regarding whether or not the user is the registered user. The vehicle 10 may restrain boarding of the user with the restraint unit 16, when determining that the user is not the registered user based on the determination result received from the server 20.

The vehicle 10 may acquire the second vital information on a user, when determining that the user is not the registered user based on the determination result received from the server 20, the determination result regarding whether or not the user is the registered user. The vehicle 10 may transmit to the server 20 the second vital information on the user acquired with the second acquisition unit 12. The control unit 17 may transmit the vehicle identification information that uniquely identifies the vehicle 10, such as the vehicle ID described above, to the server 20 together with the second vital information.

Server Configuration

Figure 3:
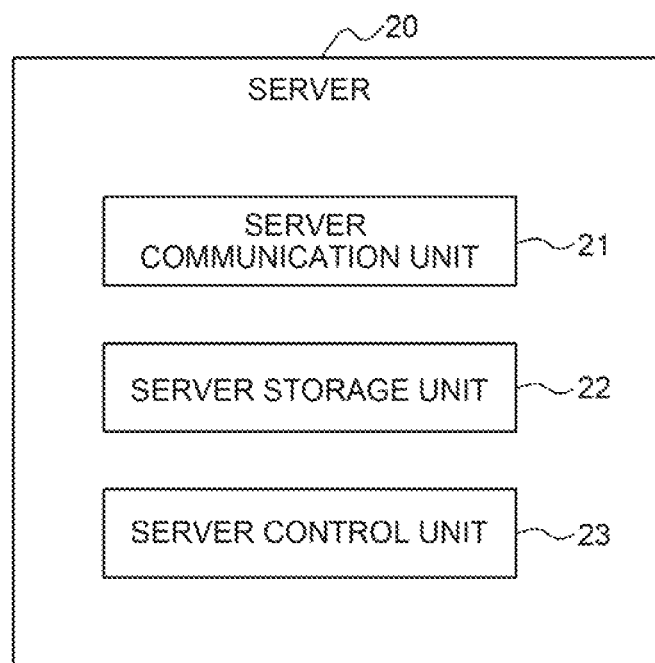
FIG. 3 is a block diagram showing the schematic configuration of a server included in the information processing system.

As shown in the block diagram of FIG. 3, the server 20 includes a server communication unit 21, a server storage unit 22, and a server control unit 23. The server communication unit 21, the server storage unit 22, and the server control unit 23 are communicably connected in a wired or wireless manner.

The server communication unit 21 includes a communication module connected to the network 30. The communication module conforms to standards, such as wired local area network (LAN) standards or wireless LAN standards. However, without being limited to these, the communication module may conform to any communication standards. In the present embodiment, the server 20 is connected to the network 30 through the server communication unit 21. Hence, the server 20 can communicate with the vehicle 10.

The server storage unit 22 includes one or more memories. The memory or memories included in the server storage unit 22 may each function as a main storage, an auxiliary storage, or a cache memory, for example. The server storage unit 22 stores any information that is used for operation of the server 20. For example, the server storage unit 22 may store information such as a system program, application programs, and a database. The information stored in the server storage unit 22 may be updated with the information that is acquired from the network 30 through the server communication unit 21, for example.

The server storage unit 22 may store, for example, information regarding the vehicle 10. The information regarding the vehicle 10 may include the vehicle identification information that uniquely identifies the vehicle 10, vehicle type information on the vehicle 10, and information on a route where the vehicle is traveling or on the location of the vehicle 10. The information on the route where the vehicle is traveling and on the location of the vehicle 10 may be updated with movement of the vehicle 10.

The server storage unit 22 may store the information regarding the registered user. The information regarding the registered user may include registered user identification information for uniquely identifying the registered user, and first vital information, second vital information, or settlement information on the registered user. For example, the registered user identification information is a registered user ID issued by the server 20. However, the registered user identification information is not limited to this. The first vital information may be face information, for example. The second vital information may be vein information, for example. The settlement information may include a user's name, a billing address, and a bank account or a credit card information used for settlement including billing, withdrawal, and charging of boarding fares or the like. Thus, the server 20 can settle a boarding fare of the registered user via the Internet, or the like. Therefore, the registered user can board the vehicle 10 without conducting an operation to pay a fare or the like. This enhances the convenience of the technique of managing the boarding information on the users who board the vehicle 10.

The server storage unit 22 may further store a boarding condition of the registered user as the information regarding the registered user. The boarding condition is a condition for permitting the registered user to board the vehicle 10. The boarding condition may include at least one of a vehicle type condition, a geographical condition, a route condition, and a temporal condition, for example. For example, the vehicle type condition may be a condition for limiting the types of the vehicle, such as a bus or a taxi, that the registered user is permitted to board. For example, the geographical condition may be a condition for limiting areas or cities where the registered user is permitted to board the vehicle. For example, the route condition may be a condition for limiting routes, sections, or bus stops where the registered user is permitted to board the vehicle. For example, the temporal condition may be a condition for limiting a date and time, a term, or the like, when the registered user is permitted to board the vehicle. The server storage unit 22 may store the boarding condition in association with at least one of the vehicle identification information, and the registered user identification information described above. When the server 20 determines whether or not a user is the registered user based on the vital information received from the vehicle 10 as described later, the boarding condition may be used in order to limit the vital information on the registered users used for comparison, reference, or the like. This may enhance the accuracy and processing speed of the determination regarding whether or not the user is the registered user of the vehicle 10.

The server control unit 23 includes one or more processors. The server control unit 23 may control each of the above-stated server communication unit 21 and the server storage unit 22 in order to implement the functions thereof.

The process of the server 20 implemented when the server control unit 23 controls each of the functions of the server 20 will be described below. For example, the server 20 stores, as the information regarding a registered user, first vital information and settlement information on the registered user in the server storage unit 22. The server 20 may store the first vital information and settlement information on the registered user in association with the boarding condition described above in the server storage unit 22. When storing new first vital information, the server 20 may determine whether or not the new first vital information is usable for uniquely identifying the corresponding registered user in comparison with other first vital information already stored in the server storage unit 22. When first vital information on a newly registered user is identical or similar to the already registered first vital information, the server 20 may determine that the first vital information is not usable for uniquely determining the newly registered user, and therefore authentication with second vital information is necessary. This determination result may be stored in association with the information on the newly registered user. This makes it possible to reduce a processing time and a processing amount required for the server 20 to determine whether the authentication with the second vital information is necessary.

The server 20 receives the first vital information on a user from the vehicle 10. The server 20 determine whether or not the user is the registered user based on the first vital information on the user received from the vehicle 10 and the first vital information on the registered user. For example, when the first vital information is face information, the server 20 may receive from the vehicle 10 a photographed image of the face of the user or features of the face extracted from the image as face information. Based on the received face information on the user, the server 20 selects face information on the same person as the user, out of the face information on a plurality of registered users stored in the server storage unit 22 as first vital information. In order for the server 20 to select, based on the received face information on the user, the face information on the same person as the user out of the face information on the registered users, any image recognition methods, such as pattern matching, feature point extraction, or machine learning, may be adopted. The server 20 may determine that the user is the registered user, when the first vital information on the same person as the user is selected out of the first vital information on the registered users. When the first vital information on the same person as the user is not selected out of the first vital information on the registered users, the server 20 may determine that the user is not the registered user.

In determination regarding whether or not the user is the registered user, the server 20 may limit the first vital information on the registered users, that is used for comparison with the first vital information on the target user received from the vehicle 10, to the first vital information on the registered users who satisfy the boarding condition. In short, based on the first vital information on the user received from the vehicle 10, and the first vital information on the registered users who satisfy the boarding condition, the server 20 may determine whether or not the user is the registered user. For example, when the vehicle type of the vehicle 10 is a bus, the server 20 may determine whether or not the user is the registered user by limiting the comparison targets to the registered users who are permitted to board the bus according to the boarding condition. For example, based on a date and time when the first vital information is transmitted from the vehicle 10, the server 20 may determine whether or not the user is the registered user by limiting the comparison targets to the registered users who are permitted to board the bus at the date and time according to the boarding condition. When the first vital information on the same person as the user is selected out of the first vital information on the registered users who are narrowed down based on the boarding condition, the server 20 may determine that the user is the registered user. When the first vital information on the same person as the user is not selected out of the first vital information on the registered users who are narrowed down by the boarding condition, the server 20 may determine that the target user is not the registered user.

The server 20 may transmit the determination result regarding whether or not the user is the registered user to the vehicle 10. When determining that the user is the registered user, the server 20 may transmit the determination result indicating that the user is the registered user to the vehicle 10. When determining that the user is not the registered user, the server 20 may transmit the determination result indicating that the user is not the registered user to the vehicle 10. The server 20 may transmit the determination result regarding whether or not the user is the registered user to the vehicle 10 so as to, for example, allow the vehicle 10 to control the restraint unit 16. The server 20 may transmits the determination result regarding whether or not the user is the registered user to the vehicle 10 so as to, for example, allow the vehicle 10 to acquire the second vital information.

When receiving the second vital information on a user from the vehicle 10, the server 20 may determine whether or not the user is the registered user based on the second vital information on the user and the second vital information on the registered users. For example, when the second vital information is vein information, the server 20 selects, based on the vein information on the user received from the vehicle 10, the vein information on the same person as the user out of the vein information on a plurality of registered users stored as the second vital information in the server storage unit 22. The server 20 may determine that the user is the registered user, when the second vital information on the same person as the user is selected out of the second vital information on the registered users. When the second vital information on the same person as the user is not selected out of the second vital information on the registered users, the server 20 may determine that the user is not the registered user. In determination regarding whether or not the user is the registered user, the server 20 may limit the second vital information on the registered users, which is used for comparison with the second vital information on the user received from the vehicle 10, to the second vital information on the registered users who satisfy the boarding condition. In short, based on the second vital information on the user received from the vehicle 10, and the second vital information on the registered users who satisfy the boarding condition, the server 20 may determine whether or not the user is the registered user.

When determining that the user is the registered user, the server 20 executes a settlement process based on the settlement information on the registered user. Although the settlement process includes at least one of the processes of a boarding fare calculation, billing, withdrawal, charging, and the like, the settlement process is not limited to these. The settlement process may include, for example, requesting other servers or the like to execute these processes. For example, when determining that the user is the registered user, the server 20 may request the server of a bank, which manages a bank account stored as the settlement information on the registered user, to perform the process of withdrawing a prescribed amount of money from the bank account.

The server 20 may determine a user type from the first vital information or second vital information on the user received from the vehicle 10. The user type may include, for example, a sex, an age, or the like, of the user. In this case, when determining that the user is the registered user, the server 20 may set the service for a boarding fare discount, or the like, in accordance with the user type of the user. Hence, the degree of satisfaction of the user of the vehicle 10 can be enhanced.

Figure 4:
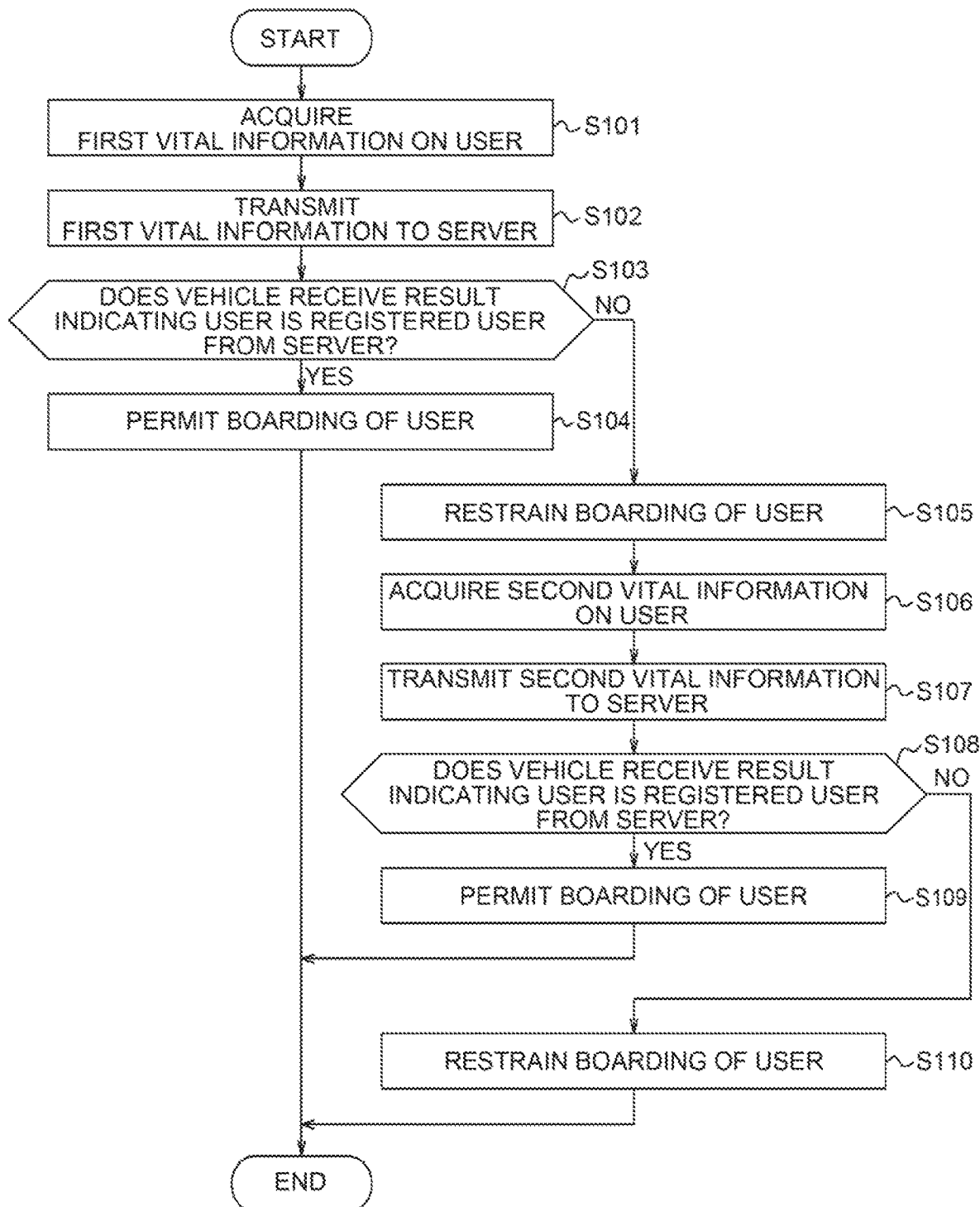
FIG. 4 is a flowchart showing a process of the vehicle.
Figure 5:
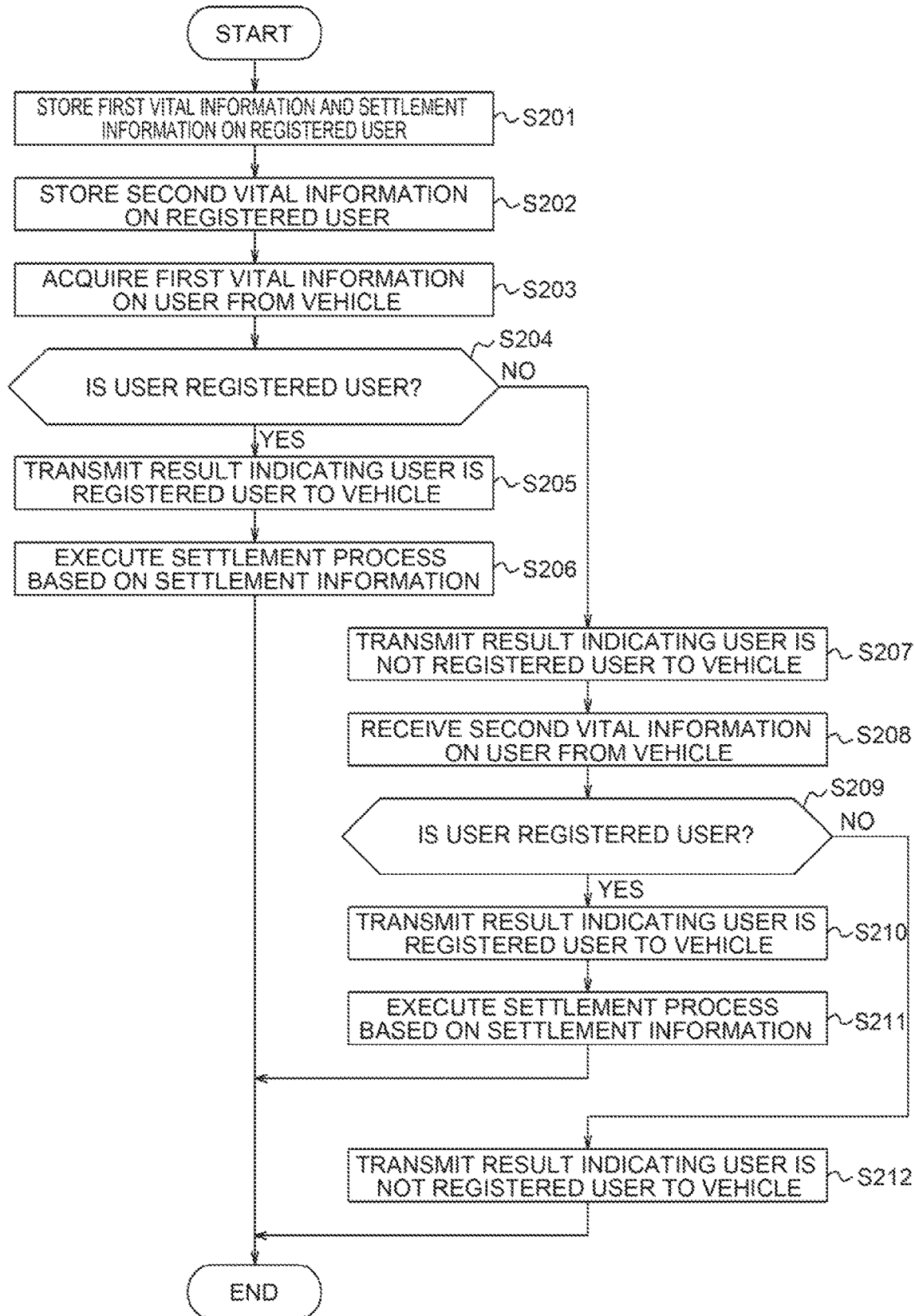
FIG. 5 is a flowchart showing a process of the server.

Hereinafter, with reference to FIGS. 4 and 5, operation flows of the vehicle 10 and the server 20 in the information processing system will be described.

Processing Flow of Vehicle

The process flow of the vehicle 10 will be described with reference to FIG. 4.

Step S101: the vehicle 10 acquires first vital information on a user who boards the vehicle 10 with the first acquisition unit 11.

Step S102: the vehicle 10 transmits to the server 20 the first vital information on the user acquired with the first acquisition unit 11.

Step S103: the vehicle 10 receives from the server 20 the result of determination made by the server 20 based on the first vital information, the determination regarding whether or not the user is the registered user.

Step S104: when receiving the determination result indicating that the user is the registered user from the server 20 (step S103—Yes), the vehicle 10 controls the restraint unit 16 to permit boarding of the user, and ends the process.

Step S105: when receiving the determination result indicating that the user is not the registered user from the server 20 (step S103-No), the vehicle 10 controls the restraint unit 16 to restrain boarding of the user.

Step S106: the vehicle 10 acquires second vital information on the user who boards the vehicle 10 with the second acquisition unit 12.

Step S107: the vehicle 10 transmits to the server 20 the second vital information on the user acquired with the second acquisition unit 12.

Step S108: the vehicle 10 receives from the server 20 the result of determination made by the server 20 based on the second vital information, the determination regarding whether or not the user is the registered user.

Step S109: when receiving a determination result indicating that the user is the registered user from the server 20 (step S108—Yes), the vehicle 10 controls the restraint unit 16 to permit boarding of the user, and ends the process.

Step S110: when receiving a determination result indicating that the user is not the registered user from the server 20 (step S108-No), the vehicle 10 controls the restraint unit 16 to restrain boarding of the user, and ends the process.

Processing Flow of Server

The process flow of the server 20 will be described with reference to FIG. 5.

Step S201: the server 20 prestores first vital information and settlement information on a registered user.

Step S202: the server 20 prestores second vital information on the registered user.

Step S203: the server 20 receives first vital information on a user who boards the vehicle 10 from the vehicle 10.

Step S204: the server 20 determine whether or not the user is the registered user based on the first vital information on the user received from the vehicle 10 and the first vital information on the registered user. In determination regarding whether or not the user is the registered user, the server 20 may limit the first vital information on the registered user to the first vital information on the registered user who satisfies a boarding condition.

Step S205: when determining that the user is the registered user (step S204—Yes), the server 20 transmits a determination result indicating that the user is the registered user to the vehicle.

Step S206: the server 20 executes a settlement process based on the settlement information on the registered user, and ends the process.

Step S207: when determining that the user is not the registered user (step S204-No), the server 20 transmits a determination result indicating that the user is not the registered user to the vehicle.

Step S208: the server 20 receives second vital information on the user who boards the vehicle 10 from the vehicle 10.

Step S209: the server 20 determine whether or not the user is the registered user based on the second vital information on the user received from the vehicle 10 and the second vital information on the registered user. In determination regarding whether or not the user is the registered user, the server 20 may limit the second vital information on the registered user to the second vital information on the registered user who satisfies the boarding condition.

Step S210: when determining that the user is the registered user (step S209—Yes), the server 20 transmits a determination result indicating that the user is the registered user to the vehicle.

Step S211: the server 20 executes the settlement process based on the settlement information on the registered user, and ends the process.

Step S212: when determining that the user is not the registered user (step S209—No), the server 20 transmits a determination result indicating that the user is not the registered user to the vehicle, and ends the process.

As described in the foregoing, the information processing system 1 according to the present embodiment includes a vehicle 10, and a server 20 that is communicable with the vehicle 10. The vehicle 10 includes a first acquisition unit 11 configured to acquire first vital information on a user who boards the vehicle 10. The vehicle 10 is configured to transmit to the server 20 the first vital information on the user acquired with the first acquisition unit 11. The server 20 is configured to prestore first vital information and settlement information on a registered user, determine whether or not the user is the registered user based on the first vital information on the user received from the vehicle 10 and the first vital information on the registered user, and execute, when determining that the user is the registered user, a settlement process based on the settlement information on the registered user. According to this configuration, the vehicle 10 can determine whether or not a user who boards or leaves the vehicle 10 is the registered user by acquiring the vital information on the user, and can settle a fare or the like. This saves the user of the vehicle 10 from possessing a passenger ticket, an IC card or a smartphone used as a passenger ticket for boarding. Therefore, the technique of managing the boarding information on users who board the vehicle 10 is enhanced. Furthermore, the information processing system 1 executes the settlement process of fares or the like, which saves the user from performing operation such as purchasing a passenger ticket, or paying a fare, when the user of the vehicle 10 boards or leaves the vehicle 10.

In the information processing system 1 according to the present embodiment, the first acquisition unit 11 of the vehicle 10 may include a camera, and the first vital information may be face information. According to the configuration, the information processing system 1 can acquire first vital information that is face information with a camera or the like in a non-contact manner. This makes it possible to restrain increase in burden of the users caused when the first acquisition unit 11 acquires the first vital information. Furthermore, when the face information is adopted as the first vital information, and the face of the user is photographed with a camera, illegal boarding and criminal acts by the user during boarding can be restrained.

In the information processing system 1 according to the present embodiment, the server 20 may be configured to prestore the boarding conditions of the registered users. In determination regarding whether or not the user is the registered user, the server 20 may limit the first vital information on the registered users to the first vital information on the registered users who satisfy a certain boarding condition. According to the configuration, in determination regarding whether or not the user is the registered user of the vehicle 10 based on the first vital information, the first vital information on the registered users used for comparison, reference, or the like, can be limited, which can enhance the accuracy and processing speed of determination.

In the information processing system 1 according to the present embodiment, the vehicle 10 may further include a restraint unit 16 configured to restrain boarding of the user. The vehicle 10 may be configured to receive from the server 20 a result of determination regarding whether or not the user is the registered user, and may restrain boarding of the user with the restraint unit 16, when it is determined that the user is not the registered user. According to the configuration, only the users who are registered as the registered users in advance are allowed to board the vehicle 10, which enhances the convenience of the technique of managing the boarding information on users who boards the vehicle 10.

In the information processing system 1 according to the present embodiment, the vehicle 10 may further include a second acquisition unit 12 configured to acquire second vital information on the user. The vehicle 10 may be configured to receive from the server 20 a result of determination regarding whether or not the user is the registered user, and transmit to the server 20 the second vital information on the user acquired with the second acquisition unit 12 when it is determined that the user is not the registered user. The server 20 may be configured to further prestore second vital information on the registered user, and when receiving the second vital information on the user from the vehicle 10, the server 20 may determine whether or not the user is the registered user based on the second vital information on the user and the second vital information on the registered user. According to the configuration, in such a case where the first vital information is not usable in determination regarding whether or not the user is the registered user, the second vital information is secondarily usable in the determination regarding whether or not the user is the registered user. This makes it possible to enhance the accuracy of determining whether or not the user is the registered user.

A program according to the embodiment causes a server 20 that is communicable with a vehicle 10 to execute the steps. The steps includes: storing first vital information and settlement information on a registered user; receiving from the vehicle 10 the first vital information on a user who boards the vehicle 10; determining whether or not the user is the registered user based on the first vital information on the user received from the vehicle 10 and the first vital information on the registered user; and executing, when determining that the user is the registered user, a settlement process based on the settlement information on the registered user. According to the configuration, the vehicle 10 can determine whether or not the user who boards or leaves the vehicle 10 is the registered user by acquiring the vital information on the user, and can settle a fare or the like. This saves the user of the vehicle 10 from possessing a passenger ticket, an IC card or a smartphone used as a passenger ticket for boarding. Therefore, the technique of managing the boarding information on users who board the vehicle 10 is enhanced.

The vehicle 10 according to the embodiment is a vehicle 10 that is communicable with a server 20. The vehicle 10 includes a first acquisition unit 11 configured to acquire first vital information on a user who boards the vehicle 10. The vehicle 10 is configured to transmit to the server 20 the first vital information on the user acquired with the first acquisition unit 11. According to the configuration, the vehicle 10 can determine whether or not the user who boards or leaves the vehicle 10 is the registered user by acquiring the vital information on the user. This saves the user of the vehicle 10 from possessing a passenger ticket, an IC card or a smartphone used as a passenger ticket for boarding. Therefore, the technique of managing the boarding information on users who board the vehicle 10 is enhanced.

The vehicle 10 according to the present embodiment includes a restraint unit 16 configured to restrain boarding of the user. The vehicle 10 may be configured to receive from the server 20 a result of determination regarding whether or not the user is the registered user, and may restrain boarding of the user with the restraint unit 16, when it is determined that the user is not the registered user. According to the configuration, only the users who are registered as the registered users in advance are allowed to board the vehicle 10, which enhances the convenience of the technique of managing the boarding information on users who board the vehicle 10.

The vehicle 10 according to the present embodiment may include a second acquisition unit 12 configured to acquire second vital information on the user. The vehicle 10 may be configured to receive from the server 20 a result of determination regarding whether or not the user is the registered user, and transmit to the server 20 the second vital information on the user acquired with the second acquisition unit 12 when it is determined that the user is not the registered user. According to the configuration, when the server 20 fails to determine whether or not the user is the registered user with the first vital information, the server 20 can secondarily determine whether or not the user is the registered user with the second vital information. This makes it possible to enhance the accuracy of determining whether or not the user is the registered user.

While the present disclosure has been described based on the drawings and embodiments, it is to be understood that those skilled in the art can easily make various transformations and corrections based on the present disclosure. Therefore, it is to be noted that these transformations and corrections are intended to be embraced in the range of the present disclosure. For example, the functions, or the like, included in each means, step, or the like, can be rearranged without causing logical inconsistency, and a plurality of means, steps, or the like, can be integrated into unity or can be divided.

For example, in the embodiment disclosed, the function of the server 20, the function described as the process of the server 20, or all or some of the process may be implemented as the function or the process of the vehicle 10. Specifically, a program describing the content of the process that implements each function of the server 20 in the embodiment is stored in the storage unit 14, such as a memory, of the vehicle 10, and the program is read and executed by the control unit 17, such as a processor, of the vehicle 10.

Moreover, a general-purpose information processing apparatus, such as a smartphone or a computer, may be configured to function as the vehicle 10 or the server 20 according to the embodiment. Specifically, a program describing the content of the process that implements each function of the vehicle 10, or the like, according to the embodiment is stored in a memory of an electronic device, and the program is read and executed by a processor of the electronic device. Therefore, the disclosure according to the present embodiment may be implemented as a program executable by the processor. For example, in the case of using a general-purpose information processing apparatus as the vehicle 10, the information processing apparatus including all or some of the configuration and functions described above as the configuration and functions of the vehicle 10 may be disposed in the vehicle 10.

In the embodiment disclosed, the vehicle 10 is configured to acquire the vital information on a user when the user boards the vehicle 10. However, the present disclosure is not limited to the embodiment. The vehicle 10 may acquire the vital information on the user not only when the user boards the vehicle 10. Rather, the vehicle 10 may acquire the vital information on the user while the user stays in the vehicle 10, or when the user leaves the vehicle 10. For example, in the case where the vehicle 10 acquires the vital information on the user when the user boards and leaves the vehicle 10 and transmits the information to the server 20, the information processing system 1 can bill the user for transportation based on the information on a boarding point and a leaving point of the user.

What is claimed is:

1. An information processing system, comprising:
a vehicle that carries passengers; and
a server that is communicable with the vehicle, wherein:
the vehicle includes:
  a first acquisition unit configured to acquire first vital information of a user who boards the vehicle; and
  a restraint unit configured to restrain boarding of the user;
the vehicle is configured to transmit to the server the first vital information of the user acquired with the first acquisition unit; and
the server is configured to
  prestore first vital information, settlement information, and a boarding condition of a registered user, the boarding condition being a condition for permitting the registered user to board the vehicle,
  limit the first vital information of the registered user to the first vital information of the registered user who satisfies the boarding condition,
  determine whether or not the user is the registered user based on the first vital information of the user received from the vehicle and the limited first vital information of the registered user,
  in response to determining that the user is the registered user, execute a settlement process based on the settlement information of the registered user, and send a first signal to the vehicle to open the restraint unit, and
  in response to determining that the user is not the registered user, send a second signal to the vehicle to restrain boarding of the user using the restraint unit,
wherein the settlement process includes at least one of a billing process, a withdrawal process and a charging process.

2. The information processing system according to claim 1, wherein:
the first acquisition unit includes a camera; and
the first vital information is face information.

3. The information processing system according to claim 1, wherein:
the vehicle further includes a second acquisition unit configured to acquire second vital information of the user;
the vehicle is configured to
  receive from the server a result of determination regarding whether or not the user is the registered user, and
  transmit to the server the second vital information of the user acquired with the second acquisition unit when it is determined that the user is not the registered user; and
the server is further configured to
  prestore second vital information of the registered user, and
  determine, when receiving from the vehicle the second vital information of the user, whether or not the user is the registered user based on the second vital information of the user and the second vital information of the registered user.

4. The information processing system according to claim 1, wherein the boarding condition is a vehicle type condition.

5. The information processing system according to claim 1, wherein the boarding condition is a geographical condition.

6. The information processing system according to claim 1, wherein the boarding condition is a route condition.

7. The information processing system according to claim 1, wherein the boarding condition is a temporal condition.

8. A non-transitory computer readable medium having stored thereon a program for causing a server communicable with a vehicle that carries passengers to execute the steps of:
storing first vital information settlement information, and a boarding condition of a registered user, the boarding condition being a condition for permitting the registered user to board the vehicle;
receiving from the vehicle first vital information of a user who boards the vehicle;
limiting the first vital information of the registered user to the first vital information of the registered user who satisfies the boarding condition;
determining whether or not the user is the registered user based on the first vital information of the user received from the vehicle and the limited first vital information of the registered user;

in response to determining that the user is the registered user, executing, a settlement process based on the settlement information of the registered user, and sending a first signal to the vehicle to open a restraint unit that, when closed, is configured to restrain boarding of the user; and in response to determining that the user is not the registered user, sending a second signal to the vehicle to restrain boarding of the user using the restraint unit, wherein the settlement process includes at least one of a billing process, a withdrawal process and a charging process.

\* \* \* \* \*